(12) United States Patent
Kim

(10) Patent No.: US 6,281,640 B1
(45) Date of Patent: Aug. 28, 2001

(54) DEVICE AND METHOD FOR CONTROLLING BRIGHTNESS OF RADIO TERMINAL

(75) Inventor: Gi-Beom Kim, Kunpo (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/590,159

(22) Filed: Jun. 8, 2000

(30) Foreign Application Priority Data

Jun. 8, 1999 (KR) .................................................. 99-21174

(51) Int. Cl.$^7$ ...................................................... G05F 1/00
(52) U.S. Cl. ........................ 315/291; 315/307; 315/77; 315/149; 315/158
(58) Field of Search .................................. 315/291, 307, 315/77, 80, 76, 149, 151, 158, 159, 169.3; 250/214 AL, 214 B, 214 C; 340/942, 952, 956

(56) References Cited

U.S. PATENT DOCUMENTS

| | | | |
|---|---|---|---|
| 4,358,714 | * 11/1982 | Sechler et al. | 315/291 |
| 4,514,727 | * 4/1985 | Antwerp | 345/148 |
| 4,786,843 | * 11/1988 | Yamamoto et al. | 315/77 |
| 5,008,695 | * 4/1991 | Nagaoka et al. | 396/101 |
| 5,334,914 | * 8/1994 | Dean et al. | 315/291 |
| 5,339,009 | * 8/1994 | Lai | 315/291 |
| 6,072,281 | * 6/2000 | Ogawa | 315/241 P |

* cited by examiner

Primary Examiner—Haissa Philogene
(74) Attorney, Agent, or Firm—Dilworth & Barrese, LLP

(57) ABSTRACT

A device for controlling brightness of a radio terminal. In the brightness control device, a photometer measures brightness of an incident light to generate an electric signal depending on the brightness. A light emitting device emits a light, and a power supply provides a power supply voltage to the light emitting device in response to a control signal. A controller measures brightness while the light emitting device is turned on/off, using the photometer, and generates the control signal for enabling the power supply to provide the power supply voltage to the light emitting device according to a brightness difference during light-on and light-off of the light emitting device. The controller comprises a switch for switching a signal output from let the photometer to either a first input node or a second input node of a comparator; the comparator for generating a signal corresponding to a difference between the signals received at the first and second input nodes thereof; and a pulse density modulation (PDM) signal generator for generating a PDM signal for the signal output from the comparator as the control signal.

6 Claims, 6 Drawing Sheets

DEVICE AND METHOD FOR CONTROLLING BRIGHTNESS OF RADIO TERMINAL

PRIORITY

This application claims priority based on an application entitled "Device and Method for Controlling Brightness of Radio Terminal" filed in the Korean Industrial Property Office on Jun. 8, 1999 and assigned Serial No. 99-21174, the contents of which are hereby incorporated by reference.

BACKGROUND OF THE INVENTION

1. Field of the Invention

The present invention relates generally to controlling the light intensity of a radio terminal, and in particular, to a device and method for controlling the brightness regardless of the capability of a light emitting device, thereby adaptively coping with a variation of the circumstances.

2. Description of the Related Art

A radio terminal uses a LED (Light Emitting Diode) for backlight, brightness of which is commonly fixed. Since the LED has a constant brightness, a user of the radio terminal can hardly sense the light in a bright place while he or she can easily sense the light in a dark place. Therefore, it is unreasonable for the LED to have constant brightness regardless of the circumstances. In addition, although the user can easily sense the light of the LED even at a low light intensity in the dark place, maintaining the constant brightness will cause a waste of the electric power. Therefore, there is a demand for a device and method for controlling the brightness of the LED according to circumstances.

SUMMARY OF THE INVENTION

It is, therefore, an object of the present invention to provide a device and method for controlling a light-emitting device in a radio terminal according to circumstances.

It is another object of the present invention to provide a device and method for controlling brightness of a radio terminal regardless of a capability of the light-emitting device.

To achieve the above objects, there is provided a device for controlling brightness of a radio terminal. In the brightness control device, a photometer measures brightness of incident light and generates an electric signal depending on the brightness. A light emitting device emits a light, and a power supply provides a voltage to the light emitting device in response to a control signal. A controller generates the control signal for enabling the power supply to provide the voltage to the light emitting device according to a brightness difference during light-on and light-off of the light emitting device. The controller comprises a switch for switching a signal output from the photometer to either a first input node or a second input node of a comparator; the comparator for generating a signal corresponding to a difference between the signals received at the first and second input nodes thereof; and a pulse density modulation (PDM) signal generator for generating a PDM signal for the signal output from the comparator as the control signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
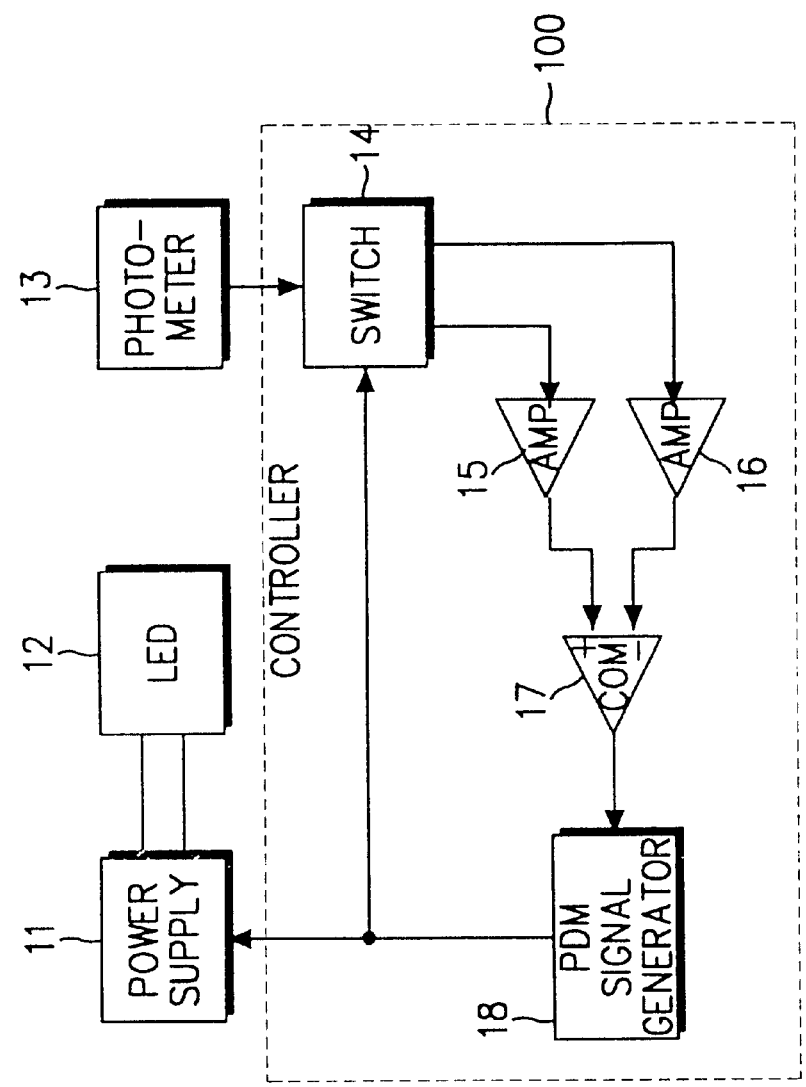
FIG. 1 is a schematic block diagram of a device for controlling brightness according to an embodiment of the present invention.

FIG. 1 shows a schematic block diagram of a device for controlling brightness according to an embodiment of the present invention. The brightness control device includes a photometer 13 for measuring brightness and to generate an electric signal depending on incident light, a light emitting diode (LED) 12 for emitting light, a power supply 11 for providing voltage to the LED 12 according to a control signal, and a controller 100 to generate a control signal for enabling the power supply 11 to provide voltage to the LED 12 depending on a brightness difference during light-on and light-off.

With regard to the controller 100, a switch 14 switches a signal output from the photometer 13 to either an amplifier 15 or an amplifier 16. The amplifiers 15 and 16 amplify the switched signal from the switch 14. A comparator 17 calculates a difference between the signals from the amplifiers 15 and 16. A pulse density modulation (PDM) signal generator 18 generates a PDM signal for a signal output from the comparator 17. When the PDM signal is HIGH, the power supply 11 enables the LED 12 and the switch 14 switches the signal output from the photometer 13 to the amplifier 15. Otherwise, when the PDM signal is LOW, the power supply 11 disables the LED 12 and the switch 14 switches the signal output from the photometer 13 to the amplifier 16.

Figure 2:
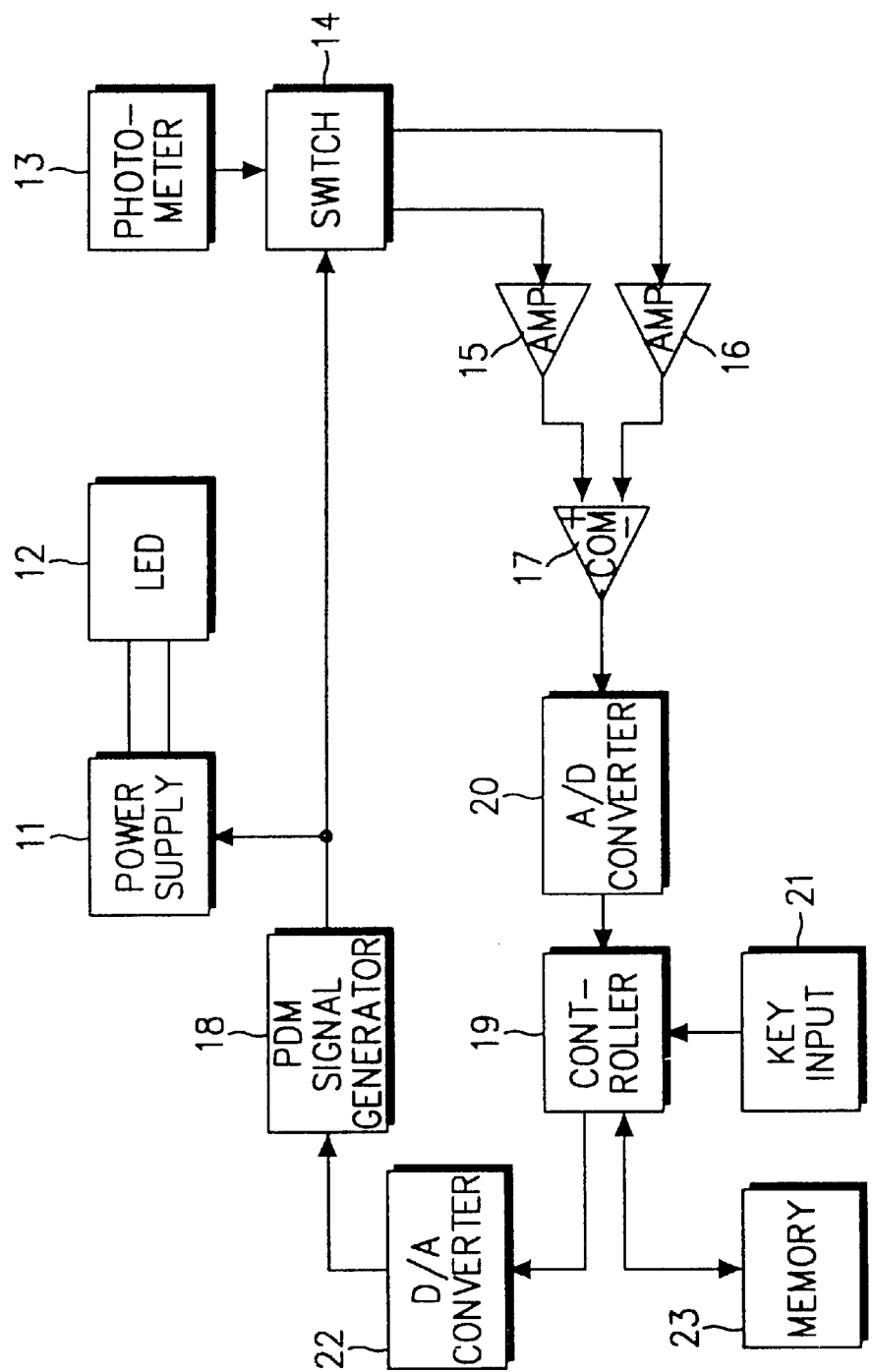
FIG. 2 is a schematic block diagram of a device for controlling brightness according to another embodiment of the present invention.

FIG. 2 shows a schematic block diagram of a device for controlling brightness according to another embodiment of the present invention. This brightness control device is designed such that the brightness is controlled at the user's request. As illustrated, compared with FIG. 1, the brightness control device further includes an analog-to-digital (A/D) converter 20, a digital-to-analog (D/A) converter 22, a controller 19, a memory 23 and a key input device 21. The key input device 21 includes a plurality of numeric keys and function keys, and provides key data to the controller 19 according to key operation of the user. A memory 23 stores brightness data input by the user. The D/A converter 22 and the A/D converter 20 convert a digital signal to an analog signal and an analog signal to a digital signal, respectively. When the user inputs brightness for a dark place and brightness for a bright place using the key input device 21, the controller 19 stores the brightness values in the memory 23.

Figure 3:
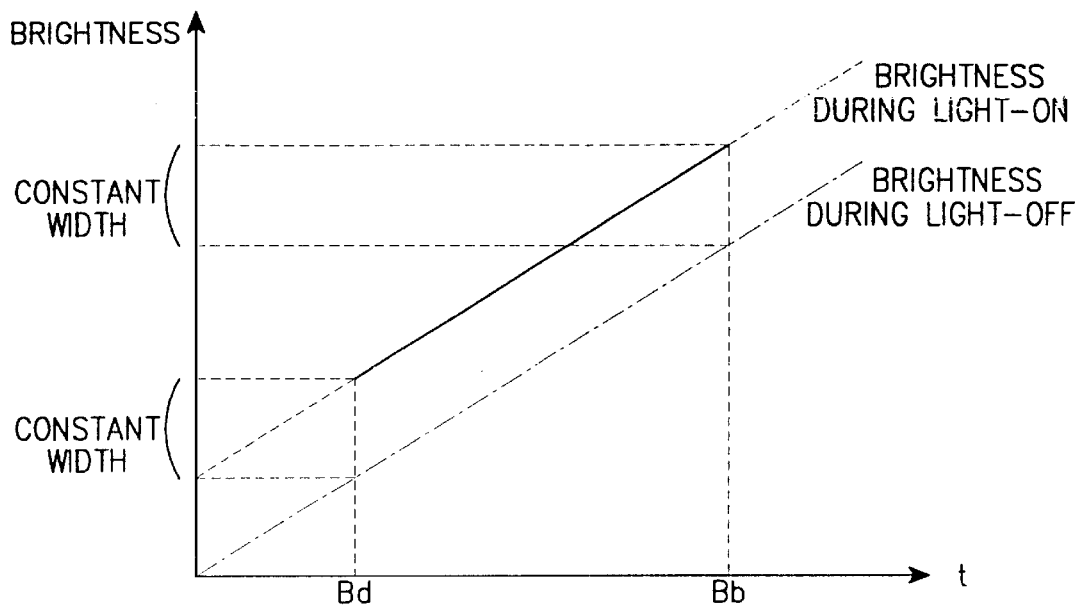
FIG. 3 is a characteristic graph for maintaining a brightness difference during light-on and light-off according to an embodiment of the present invention.
Figure 4:
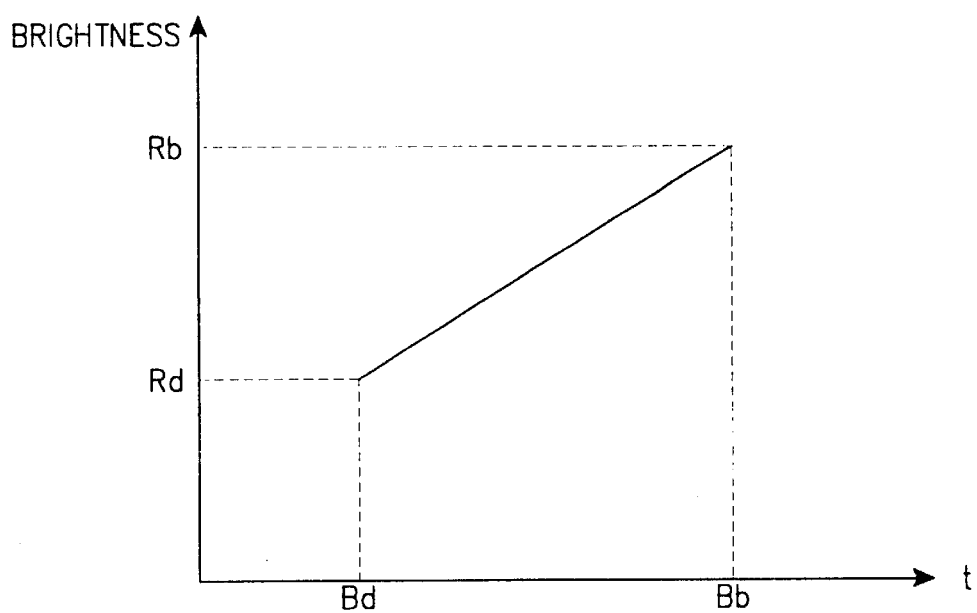
FIG. 4 is a characteristic graph for controlling brightness according to an embodiment of the present invention.
Figure 5:
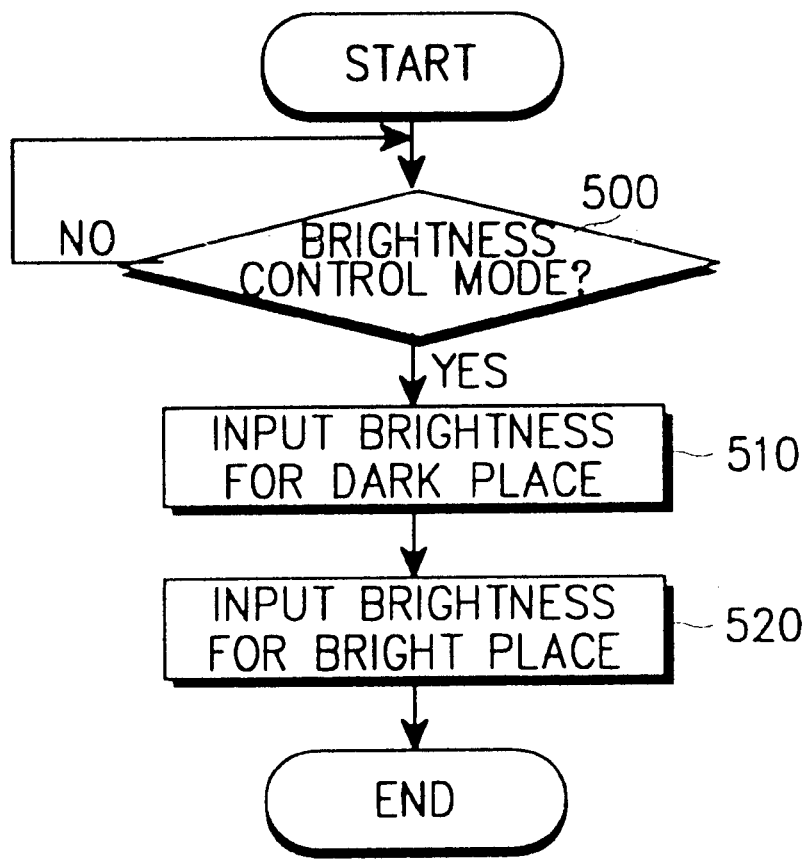
FIG. 5 is a flow chart illustrating a procedure for receiving brightness information according to an embodiment of the present invention.
Figure 6:
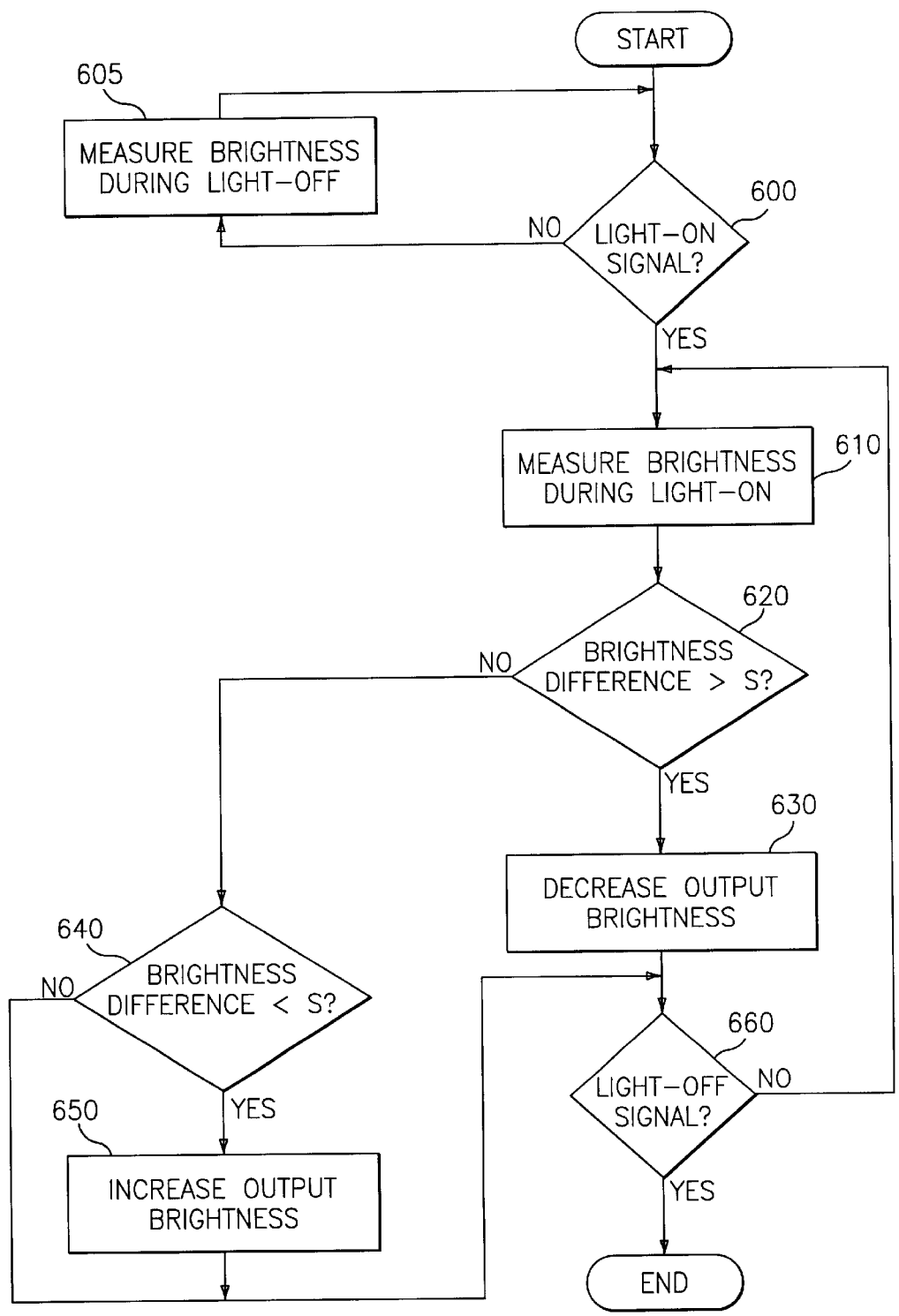
FIG. 6 is a flow chart illustrating a procedure for controlling brightness according to an embodiment of the present invention.

FIG. 3 is a characteristic graph for maintaining a brightness difference during light-on and light-off according to an embodiment of the present invention. FIG. 4 is a characteristic graph for controlling brightness according to an embodiment of the present invention. FIG. 5 is a flow chart illustrating a procedure for receiving brightness information according to an embodiment of the present invention. FIG. 6 is a flow chart illustrating a procedure for controlling brightness according to an embodiment of the present invention.

A detailed description of the embodiment will be made with reference to FIGS. 1, 3 and 6. The controller 100 determines in step 600 whether a light-on signal is generated. The light-on signal is generated when the user presses a specific key to use the radio terminal in an idle state. If the light-on signal is not generated then the controller 100 measures the ambient light brightness during light-off as in step 605. Upon detection of the light-on signal, the controller 100 measures the brightness during light-on and light-off in step 610. The controller 100 determines in step 620 whether a brightness difference during light-on and light-off is larger than a threshold S. When the brightness difference is larger than S, the controller 100 decreases the brightness in step 630. Otherwise, when the brightness difference is smaller than S, the controller 100 examines in step 640 whether the brightness difference during light-on and light-off is smaller than S. When the brightness difference is smaller than S, the controller 100 increases the brightness in step 650. Otherwise, the controller 100 examines in step 660 whether a light-off signal is generated. Upon detection of the light-off signal, the controller 100 turns off the light and then ends the procedure. Otherwise, the controller 100 returns to step 610.

In sum, a brightness difference is detected during light-on and light-off to maintain the brightness difference. Therefore, the device can adaptively operate according to circumstances, and the brightness difference during light-on and light-off is maintained regardless of the capability of the LED. Actually, the PDM signal has a very short recycle period so that it can adaptively cope with even an instantaneous variation of the light.

Figure 7:
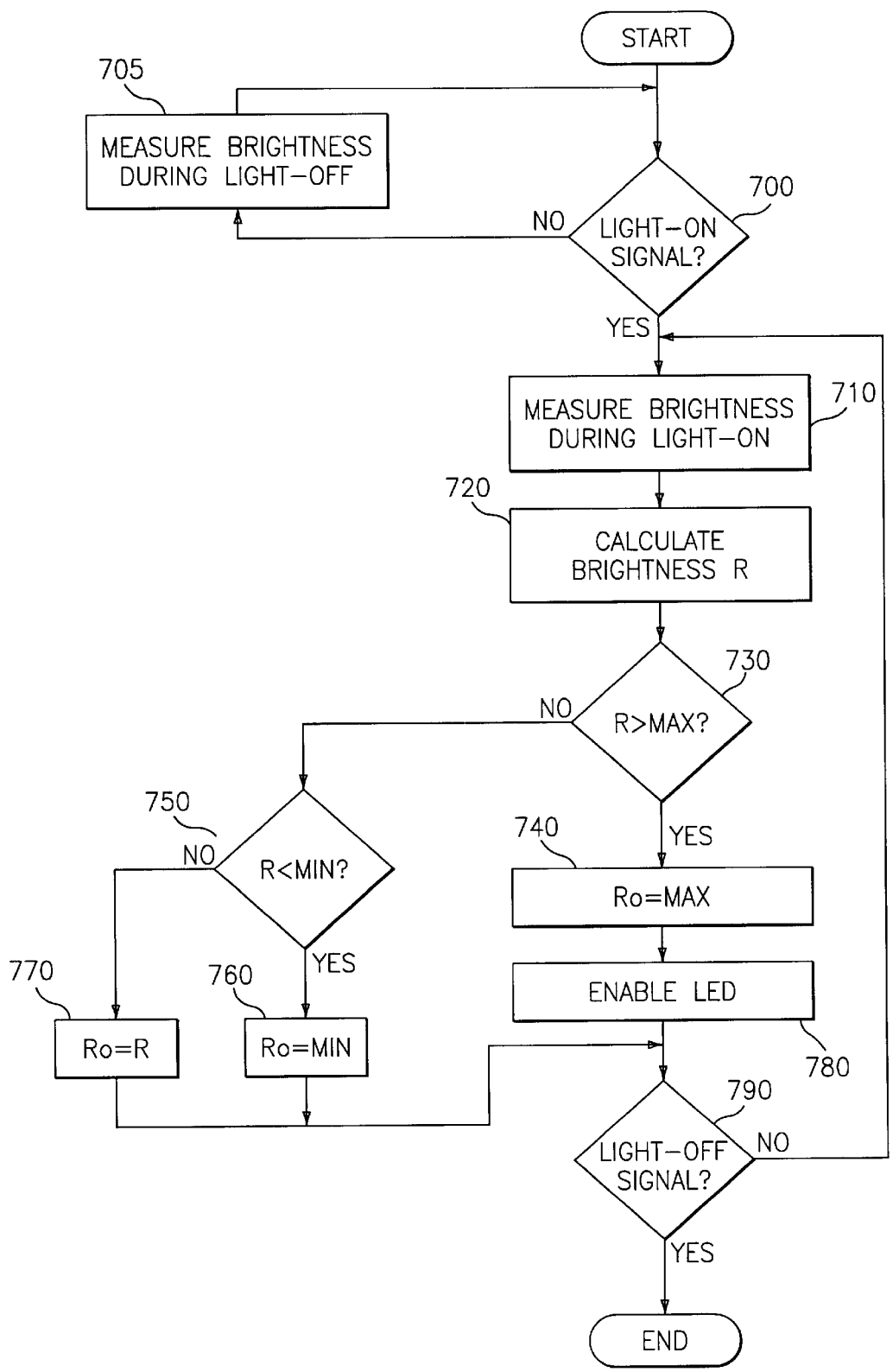
FIG. 7 is a flow chart illustrating a procedure for maintaining a brightness difference during light-on and light-off according to another embodiment of the present invention.

FIG. 7 shows a procedure for maintaining a brightness difference during light-on and light-off according to another embodiment of the present invention.

A description of another embodiment will be made with reference to FIGS. 2, 4, 5 and 7. The controller 19 stores in the memory 23 brightness for a dark place $R_d$ and brightness for a bright place $R_b$, which are input by the user in accordance with the procedure of FIG. 5. The controller 19 determines in step 700 whether a light-on signal is generated. If the light-on signal is not generated then the controller 100 measures the ambient light brightness during light-off as in step 705. Upon detection of the light-on signal, the controller 19 measures brightness B during light-off in step 710. Thereafter, in step 720, the controller 19 calculates first brightness R for a specific environment, using the measured brightness B, the user input brightnesses $R_d$ and $R_b$, the brightness for the dark place $B_d$ (LED off), and brightness for the bright place $B_b$ (LED on). The first brightness R is determined by Equation (1) below.

$$R = \frac{R_d - R_b}{B_d - B_b}(B - B_d) + R_d \quad (1)$$

After calculating the first brightness R, the controller 19 examines in step 730 whether the first brightness R is higher than a maximum brightness of the LED. When the first brightness is higher than the maximum brightness, the controller 19 sets output brightness $R_o$ to the maximum brightness in step 740. Otherwise, the controller 19 examines in step 750 whether the first brightness R is lower than minimum brightness of the LED. When the first brightness R is lower than the minimum brightness, the controller 19 sets the output brightness $R_o$ to the minimum brightness in step 760. Otherwise, when the first brightness R is not lower than the minimum brightness, the controller 19 sets the output brightness $R_o$ to the first brightness R in step 770. Thereafter, the controller 19 enables the LED in step 780 as described with reference to FIG. 1. After enabling the LED, the controller 19 examines in step 790 whether a light-off signal is generated. Upon detection of the light-off signal, the controller 19 disables the LED and ends the procedure. Otherwise, the controller 19 returns to step 710. The signal output through the above process has the characteristic shown in FIG. 4. In practice, a line indicating the brightness requested by the user will be shifted up and down as shown in FIG. 3.

In sum, the controller 19 stores brightness for a dark place and brightness for a bright place. Thereafter, the controller 19 calculates the first brightness R using brightness during light-off. When the first brightness R falls within a LED operating range, the controller 19 emits the light at the first brightness. Otherwise, the controller 19 emits the light at the maximum or minimum brightness.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for controlling brightness of a radio terminal, comprising:
    a photometer for measuring brightness of incident light and to generate an electric signal depending on the brightness;
    a light emitting device for emitting a light;
    a power supply for providing a voltage to the light emitting device in response to a control signal; and
    a controller for generating said control signal for enabling the power supply to provide voltage to the light emitting device according to a brightness difference during light-on and light-off of the light emitting device.

2. The device as claimed in claim 1, wherein the controller comprises:
    a switch for switching a signal output from the photometer to one of a first input node and a second input node of a comparator;
    the comparator for generating a signal corresponding to a difference between the signals received at the first and second input nodes thereof; and
    a pulse density modulation (PDM) signal generator for generating a PDM signal based on the signal output from the comparator as the control signal.

3. A device for controlling brightness of a radio terminal, comprising:

a light emitting device for emitting a light;

a photometer for measuring brightness and to generate an electric signal depending on the measured brightness;

a power supply for providing a voltage to the light emitting device in response to a control signal;

an analog-to-digital converter for converting an analog input signal to a digital signal;

a digital-to-analog converter for converting a digital input signal to an analog signal;

a comparator having an output node connected to the analog-to-digital converter, for calculating a difference between the signals received at a first and a second input node thereof;

a switch for switching the signal output from the photometer to the first or second input node of the comparator in response to a switching signal;

a PDM signal generator connected to an output node of the digital-to-analog converter, for generating said control signal and switching signal;

a key input device for generating key data according to key operation of a user; and a controller for calculating brightness depending on brightness for a dark place and brightness for a bright place and providing the calculated brightness to the digital-to-analog converter, so as to enable the PDM signal generator to generate the control signal and the switching signal.

4. A method for controlling brightness of a radio terminal including a photometer for measuring brightness to generate an electric signal depending on incident light, a light emitting device for emitting a light, and a power supply for providing a voltage to the light emitting device in response to a control signal, the method comprising the steps of:

determining if a light-on signal for enabling the light emitting device is generated;

if the light-on signal is generated, then measuring brightness of the light emitting device;

causing the power supply to decrease the voltage being provided to the light emitting device, when a difference between the measured light-on brightness and light-off brightness is larger than a threshold;

causing the power supply to increase the voltage being provided to the light emitting device, when the difference between the measured light-on brightness and light-off brightness is smaller than the threshold;

maintaining a level of the voltage being provided to the light emitting device, when the brightness difference equals the threshold; and returning to the brightness measuring step, upon failure to detect a light-off signal.

5. A method for controlling brightness of a radio terminal including a photometer for measuring brightness to generate an electric signal depending on an incident light, a light emitting device for emitting a light, a power supply for providing a voltage to the light emitting device in response to a control signal, and a memory for storing an indication of brightness for a bright place and brightness for a dark place, input by a user, the method comprising the steps of:

determining if a light-on signal for enabling the light emitting device is generated;

if the light-on signal is generated, then measuring brightness during light-off of the light emitting device;

calculating first brightness according to the measured brightness, the brightness for the bright place and the brightness for the dark place;

emitting light at maximum brightness, when the first brightness is higher than the maximum brightness of the light emitting device;

emitting light at minimum brightness, when the first brightness is lower than the minimum brightness of the light emitting device;

emitting light at the first brightness, when the first brightness falls within an available output brightness of the light emitting device; and returning to light measuring step, upon failure to detect a light-off signal.

6. The device as claimed in claim 5, wherein the first brightness is calculated by $$R = \frac{R_d - R_b}{B_d - B_b}(B - B_d) + R_d$$

where, R: first brightness

B: measured brightness during light-off $R_b$: brightness for a bright place, input by the user $R_d$: brightness for a dark place, input by the user $B_b$: brightness for a bright place $B_d$: brightness for a dark place.

* * * * *